US012575482B2

(12) United States Patent (10) Patent No.: US 12,575,482 B2
Hodel (45) Date of Patent: Mar. 17, 2026

(54) SEED ACCELERATOR

(71) Applicant: Precision Planting LLC, Tremont, IL (US)

(72) Inventor: Jeremy J. Hodel, Morton, IL (US)

(73) Assignee: Precision Planting LLC, Tremont, IL (US)

( * ) Notice: Subject to any disclaimer, the term of this patent is extended or adjusted under 35 U.S.C. 154(b) by 77 days.

(21) Appl. No.: 18/690,303

(22) PCT Filed: Sep. 23, 2022

(86) PCT No.: PCT/IB2022/059040
§ 371 (c)(1),
(2) Date: Mar. 8, 2024

(87) PCT Pub. No.: WO2023/062463
PCT Pub. Date: Apr. 20, 2023

(65) Prior Publication Data
US 2025/0127075 A1 Apr. 24, 2025

Related U.S. Application Data

(60) Provisional application No. 63/262,360, filed on Oct. 11, 2021.

(51) Int. Cl.
*A01C 7/16* (2006.01)
(52) U.S. Cl.
CPC ..................................... *A01C 7/16* (2013.01)
(58) Field of Classification Search
None
See application file for complete search history.

(56) References Cited

U.S. PATENT DOCUMENTS

| | | | | | |
|---|---|---|---|---|---|
| 2,618,373 | A | * | 11/1952 | Hathaway | A24B 3/16 |
| | | | | | 198/380 |
| 2,783,918 | A | * | 3/1957 | Bramblett | A01C 7/18 |
| | | | | | 222/274 |
| 2,935,957 | A | * | 5/1960 | Denton | A01C 9/00 |
| | | | | | 221/9 |
| 3,134,346 | A | * | 5/1964 | Mann | A01C 5/062 |
| | | | | | 222/149 |
| 3,195,485 | A | * | 7/1965 | Reynolds | A01C 5/062 |
| | | | | | 111/152 |
| 3,217,674 | A | * | 11/1965 | Williams | A01C 5/062 |
| | | | | | 111/140 |

(Continued)

FOREIGN PATENT DOCUMENTS

| | | |
|---|---|---|
| DE | 102010016389 A1 | 10/2011 |
| DE | 102015114146 A1 | 3/2017 |
| DE | 102018112948 A1 | 12/2019 |

OTHER PUBLICATIONS

UK Intellectual Property Office, Search Report for related UK Application No. 2114710.3, dated Jun. 22, 2022, 4 pages.

(Continued)

*Primary Examiner* — Joseph A Dillon, Jr.

(57) ABSTRACT

A seeding system having a seed meter; a conduit for receiving seeds released from the seed meter at a first end of the conduit; a gas source connected to the conduit proximate the first end for accelerating seed in the gas; and a seed orientation coil assembly connected to the second end to receive the accelerated seed.

5 Claims, 11 Drawing Sheets

(56) References Cited

U.S. PATENT DOCUMENTS

| | | | | |
|---|---|---|---|---|
| 3,482,735 A * | 12/1969 | Goulter | A01C 7/081 | 111/179 |
| 3,623,595 A * | 11/1971 | Brown | A24B 3/16 | 198/380 |
| 3,636,897 A * | 1/1972 | Brink | A01C 7/04 | 111/178 |
| 3,790,026 A * | 2/1974 | Neumeister | A01C 7/044 | 111/180 |
| 3,848,552 A * | 11/1974 | Bauman | A01C 7/044 | 987/202 |
| 3,860,146 A * | 1/1975 | Bauman | A01C 7/044 | 221/168 |
| 3,881,631 A * | 5/1975 | Loesch | A01C 7/044 | 221/6 |
| 3,891,120 A * | 6/1975 | Loesch | A01C 7/044 | 111/180 |
| 4,798,151 A * | 1/1989 | Rodrigues, Jr. | A01C 5/062 | 111/80 |
| 5,082,141 A * | 1/1992 | Martin | B02C 4/16 | 221/277 |
| 5,524,559 A * | 6/1996 | Davidson | A01C 7/081 | 221/277 |
| 5,601,209 A * | 2/1997 | Barsi | A01C 7/0445 | 111/179 |
| 5,603,269 A * | 2/1997 | Bassett | A01B 63/114 | 111/140 |
| 5,974,988 A * | 11/1999 | Stufflebeam | A01C 7/082 | 111/200 |
| 6,148,748 A * | 11/2000 | Bardi | A01C 7/081 | 111/905 |
| 6,178,901 B1 * | 1/2001 | Anderson | A01C 5/062 | 111/152 |
| 6,332,413 B1 * | 12/2001 | Stufflebeanm | A01C 7/102 | 111/184 |
| 6,367,396 B1 * | 4/2002 | Meyer | A01C 7/206 | 111/176 |
| 6,827,029 B1 * | 12/2004 | Wendte | A01C 7/205 | 111/185 |
| 7,270,064 B2 * | 9/2007 | Kjelsson | A01C 7/20 | 111/174 |
| 7,426,894 B2 * | 9/2008 | Peterson | A01C 7/105 | 111/903 |
| 7,509,915 B2 * | 3/2009 | Memory | A01C 7/206 | 111/900 |
| 7,735,626 B2 * | 6/2010 | Cope | G01N 1/04 | 111/178 |
| 7,814,849 B1 * | 10/2010 | McOmber | A01C 7/206 | 111/174 |
| 7,997,415 B2 * | 8/2011 | Mongan | B07C 5/344 | 198/690.1 |
| 8,245,439 B2 * | 8/2012 | Deppermann | G01N 15/1433 | 47/58.1 SE |
| 8,286,387 B2 * | 10/2012 | Becker | G01N 1/286 | 47/58.1 SE |
| 8,336,471 B2 * | 12/2012 | Gilstring | A01C 7/0445 | 111/185 |
| 8,757,074 B2 * | 6/2014 | Cruson | A01C 7/206 | 111/176 |
| 8,789,482 B2 * | 7/2014 | Garner | A01C 7/16 | 111/171 |
| 9,043,950 B2 * | 6/2015 | Wendte | A01C 7/20 | |
| 9,137,941 B2 * | 9/2015 | Stark | A01C 5/068 | |
| 9,521,804 B2 * | 12/2016 | Wendte | A01C 7/102 | |
| 9,591,798 B2 * | 3/2017 | Horsch | A01C 7/042 | |
| 9,717,173 B2 * | 8/2017 | Sheppard | A01C 5/062 | |
| 9,861,025 B2 * | 1/2018 | Schaefer | A01C 7/20 | |
| 9,924,629 B2 * | 3/2018 | Batcheller | A01B 79/02 | |
| 10,412,879 B2 * | 9/2019 | Cruson | B65G 53/58 | |
| 10,448,561 B2 * | 10/2019 | Schoeny | A01C 7/102 | |
| 10,743,460 B2 * | 8/2020 | Gilbert | A01C 7/082 | |
| 10,785,905 B2 * | 9/2020 | Stoller | A01C 5/068 | |
| 10,945,363 B2 * | 3/2021 | Donadon | A01C 7/081 | |
| 10,952,366 B2 * | 3/2021 | Rhodes | A01C 7/20 | |
| 10,959,368 B2 * | 3/2021 | Donadon | A01C 7/206 | |
| 10,993,366 B2 * | 5/2021 | Schoeny | A01C 7/206 | |
| 10,999,966 B2 * | 5/2021 | Schoeny | A01C 7/206 | |
| 11,751,501 B2 * | 9/2023 | Dille | A01C 5/062 | 111/147 |
| 12,185,659 B2 * | 1/2025 | Dille | A01C 7/20 | |
| 12,245,542 B2 * | 3/2025 | Koch | A01C 7/046 | |
| 12,274,200 B2 * | 4/2025 | Dille | A01C 7/082 | |
| 12,302,780 B2 * | 5/2025 | Leifker | A01C 7/105 | |
| 2002/0100400 A1 | 8/2002 | Meyer | | |
| 2002/0144637 A1 * | 10/2002 | Wendling | A01C 7/042 | 111/163 |
| 2003/0005867 A1 | 1/2003 | Richard | | |
| 2003/0159631 A1 * | 8/2003 | Sauder | A01C 7/04 | 111/171 |
| 2006/0278726 A1 * | 12/2006 | Holly | A01C 7/20 | 239/69 |
| 2008/0121154 A1 | 5/2008 | Memory | | |
| 2008/0257237 A1 * | 10/2008 | Friesen | A01C 7/06 | 111/194 |
| 2012/0042813 A1 * | 2/2012 | Liu | A01C 7/105 | 111/149 |
| 2012/0312212 A1 | 12/2012 | Cruson | | |
| 2013/0152836 A1 * | 6/2013 | Deppermann | A01C 7/048 | 111/199 |
| 2015/0101518 A1 * | 4/2015 | Arnold | A01B 49/06 | 111/174 |
| 2015/0122162 A1 * | 5/2015 | Horsch | A01C 7/042 | 111/200 |
| 2017/0105334 A1 * | 4/2017 | Nyc | A01C 7/044 | |
| 2017/0181370 A1 * | 6/2017 | Sheppard | A01C 7/06 | |
| 2017/0245421 A1 * | 8/2017 | Donolo | A01C 7/046 | |
| 2018/0279545 A1 * | 10/2018 | Pirkenseer | A01C 7/206 | |
| 2019/0223372 A1 | 7/2019 | Koch et al. | | |
| 2019/0230846 A1 | 8/2019 | Koch et al. | | |
| 2019/0289778 A1 | 9/2019 | Koch et al. | | |
| 2019/0289779 A1 | 9/2019 | Koch et al. | | |
| 2019/0364724 A1 | 12/2019 | Radtke et al. | | |
| 2020/0128725 A1 | 4/2020 | Rhodes et al. | | |
| 2020/0187410 A1 * | 6/2020 | Bredeweg | A01C 7/20 | |
| 2020/0229343 A1 * | 7/2020 | do Amaral Assy | A01C 7/20 | |
| 2020/0359551 A1 * | 11/2020 | Donadon | A01C 7/0445 | |
| 2020/0359552 A1 * | 11/2020 | Gilbert | A01C 7/20 | |
| 2020/0367425 A1 | 11/2020 | Dille et al. | | |
| 2021/0051844 A1 * | 2/2021 | Couto | A01C 7/128 | |
| 2021/0153423 A1 * | 5/2021 | Donadon | A01C 7/0445 | |
| 2022/0087097 A1 * | 3/2022 | Leifker | A01C 7/20 | |
| 2022/0192079 A1 * | 6/2022 | Dille | A01C 7/084 | |
| 2023/0247933 A1 * | 8/2023 | Kruse | A01C 7/084 | 111/179 |
| 2024/0334863 A1 * | 10/2024 | Borkgren | B65G 53/528 | |
| 2024/0373780 A1 * | 11/2024 | Strang | A01C 7/16 | |
| 2024/0423114 A1 * | 12/2024 | Hodel | A01C 7/046 | |
| 2025/0000013 A1 * | 1/2025 | Hodel | A01C 7/206 | |
| 2025/0063980 A1 * | 2/2025 | Hodel | A01C 5/066 | |
| 2025/0143205 A1 * | 5/2025 | Hodel | A01C 7/20 | |
| 2025/0241230 A1 * | 7/2025 | Dille | A01C 7/082 | |

OTHER PUBLICATIONS

UK Intellectual Property Office, Search Report for related UK Application No. 2114711.1, dated Jun. 23, 2022, 3 pages.

UK Intellectual Property Office, Search Report for related UK Application No. 2114712.9, dated Jun. 22, 2022, 3 pages.

European Patent Office, International Search Report related to International Patent Application No. PCT/IB2022/059040 , mail date Dec. 5, 2022, 11 pages.

European Patent Office, International Search Report related to International Patent Application No. PCT/IB2022/059679, mail date Jan. 9, 2023, 12 pages.

European Patent Office, International Search Report related to International Patent Application No. PCT/IB2022/059680, mail date Jan. 9, 2023, 13 pages.

* cited by examiner $F_A$ = Air Force (Air Drag on Seed from Air Jets)
$F_C$ = Centrifugal Force (Apparent Force)
$F_{SF}$ = Riding Surface Friction

SEED ACCELERATOR

CROSS-REFERENCE TO RELATED APPLICATIONS

This application is a national phase entry under 35 U.S.C. § 371 of International Patent Application PCT/IB2022/059040, filed Sep. 23, 2022, designating the United States of America and published in English as International Patent Publication WO 2023/062463 A1 on Apr. 20, 2023, which claims priority to U.S. Provisional Application No. 63/262,360, filed 11 Oct. 2021, which is incorporated herein by reference in its entirety.

BACKGROUND

There are several methods of orienting seeds for planting. Examples of orientation systems include PCT Publication Nos. WO2018013858A1, WO2018013859A1, WO2018013860A2, and WO2018013861A1. One particular seed orienter is described in U.S. Patent Publication No. US2020/0367425A1, which discloses a seed orientation coil 40. Seed is accelerated with air into the coil, and the air is dissipated via vents 68.

DETAILED DESCRIPTION

Figure 1:
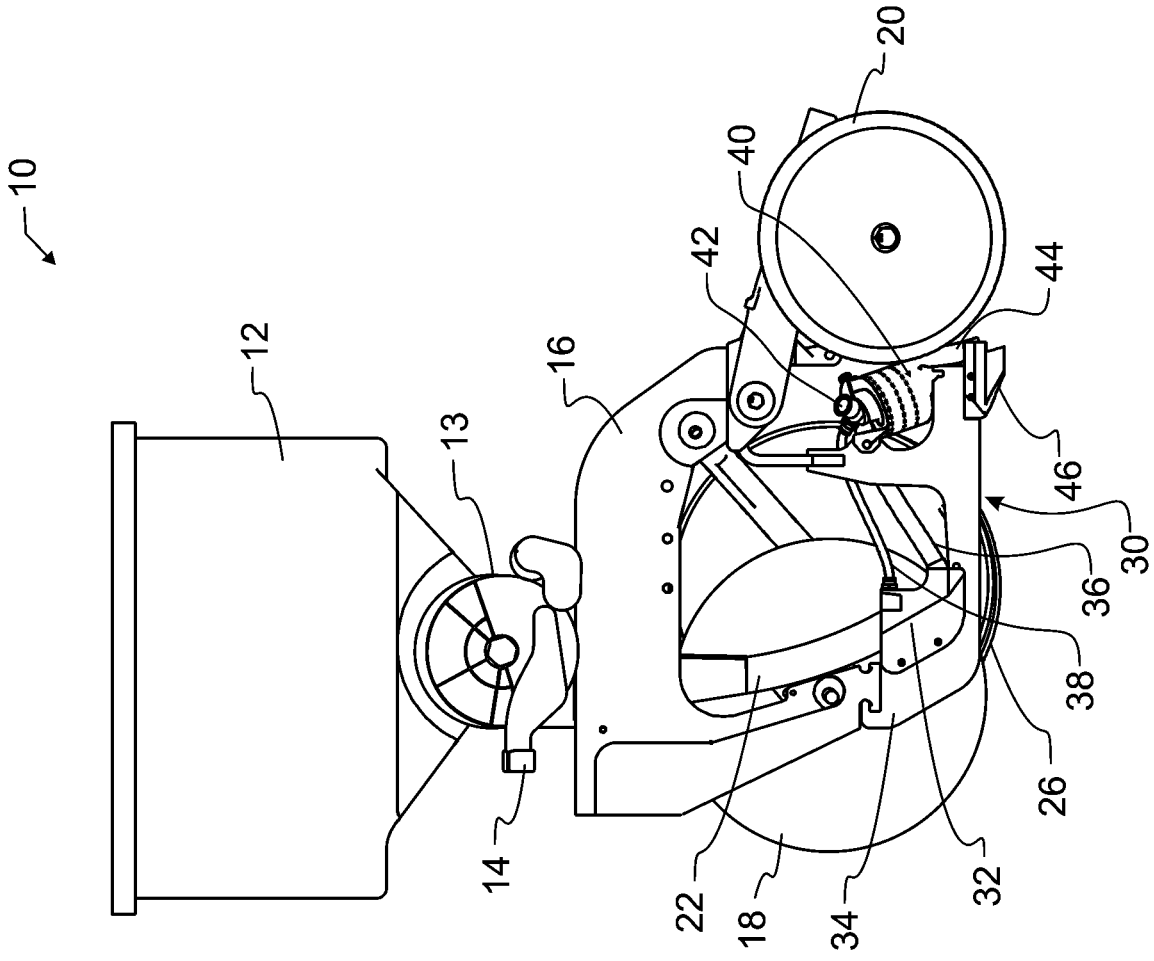
FIG. 1 illustrates a plan view of a first embodiment of the seed orientation system integrated into a planter row unit.

All references cited herein are incorporated herein in their entireties. If there is a conflict between a definition herein and in an incorporated reference, the definition herein shall control.

Referring to the drawings, wherein like reference numerals designate identical or corresponding parts throughout the several views.

FIG. 1 illustrates a row unit 10 with the seed orientation system 30 of the present invention installed. Row unit 10 is an example of a commonly found planter unit designed for the purpose of delivering a seed into a furrow. Row unit 10 would typically be found mounted to a tool bar that attaches to a tractor or similar towing device along with other identical or similar planting row units. Row units can be found in even number groups from a few units to as many as forty-eight row units.

The typical row unit 10 includes seed hopper 12 for storing the seed for planting. The seed is directed to a seed meter 13. The seed meter 13 may use a conventional vacuum disk driven by a vacuum delivery line 14. The seed meter 13 acts to singulate the seed at a desired spacing for delivery to the ground. From the seed meter 13, the seed is delivered to the ground through seed tube 22.

A shank structure 16 provides the structural support for the seed hopper 12, seed meter 13 and the seed tube 22. Opener blade 18, a gauge wheels 26 and a closing wheels 20 are also attached to the shank 16. The opener blades 18 forms a trench or furrow in the soil ahead of the seed tube 22. The gauge wheel 26 control the depth of the furrow and the closing wheels 20 close the furrow over the seed.

In a first embodiment, seed orientation system 30 is mounted to the row unit 10. Seed orientations system 30 includes a seed collector 32 operably attached to the seed tube 22. The seed collector 32 gathers the seed and changes its direction by way of a seed transfer tube 36 to a seed orientation coil assembly 40. The seed passes through the helical path of the seed orientation coil assembly 40 to an oriented seed exit path 44. A sub-furrow opener 46 creates a wedge shaped trough within the furrow for capturing the oriented seed.

Movement of the seed throughout the seed orientation system 30 is aided by air from a central blower/fan. Air is first directed to system air infeed 42 disposed on the upper face of the seed orientation coil assembly 40. An air line 38 is then directed to seed collector 32 for moving the seed from the seed collector 32 to the seed orientation coil assembly 40.

Figure 2:
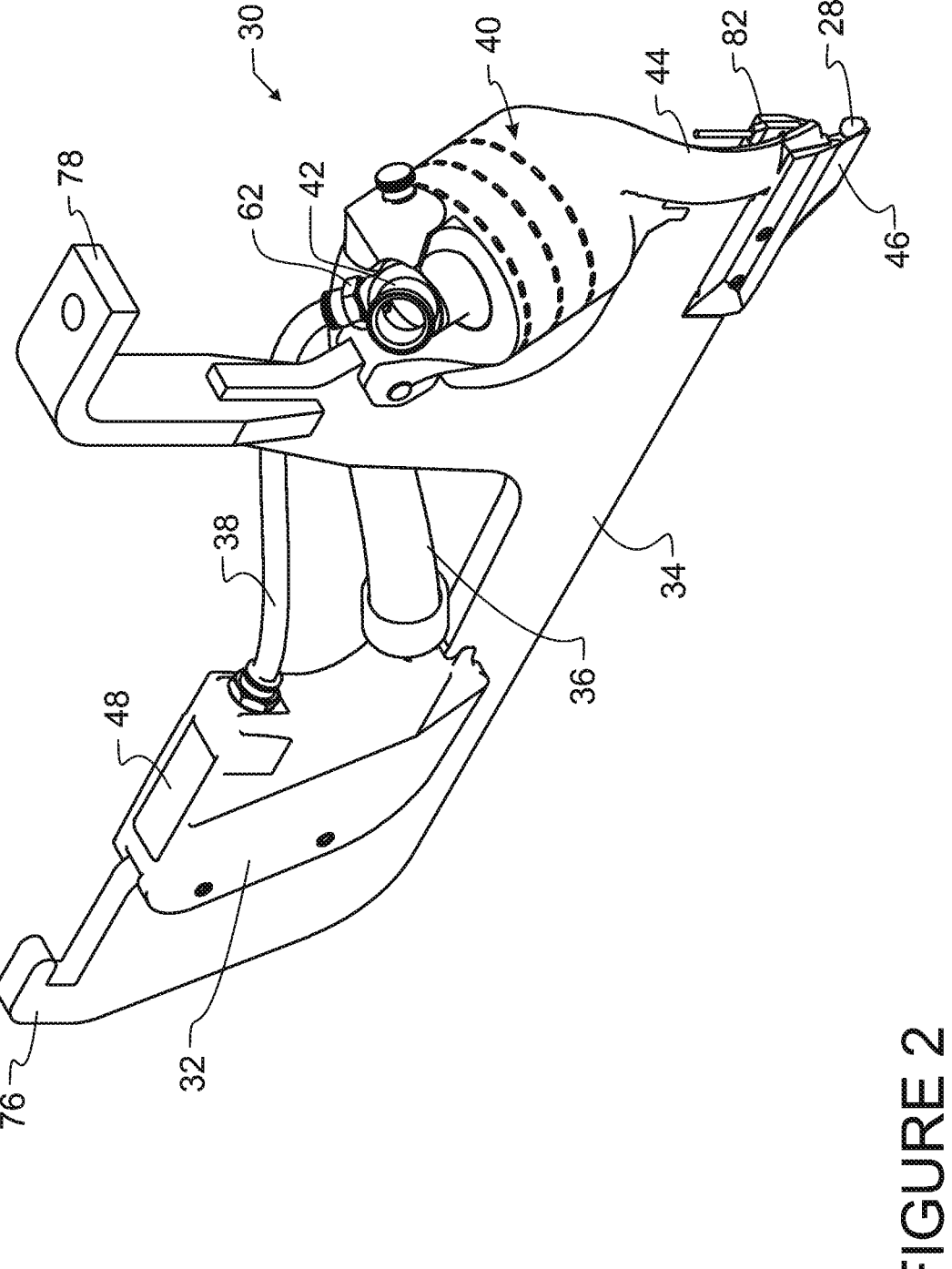
FIG. 2 is a perspective view of first embodiment of the seed orientation system.
Figure 3:
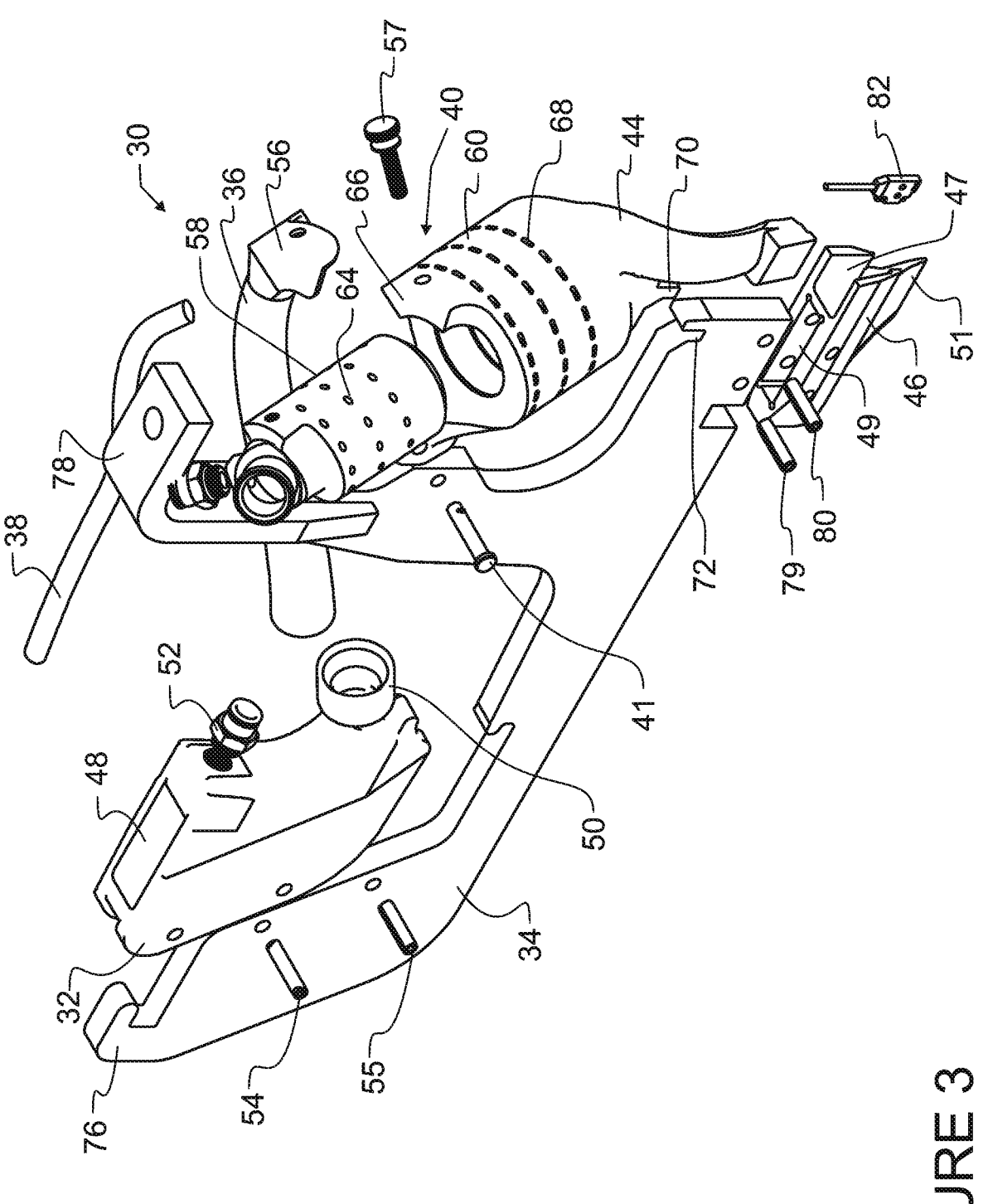
FIG. 3 is an exploded perspective view of a first embodiment of the seed orientation system.

A seed orientation support structure 34 provides the structural support for the seed collector 32, seed transfer tube 36, the seed orientation coil assembly 30 and the sub-furrow opener 46. The seed orientation support structure 34 may be connected to the shank structure 16 at one or more locations. The seed orientation support structure 34 also acts to keep debris out of the furrow and to protect against rock impacts FIGS. 2 and 3 depict the seed orientation system 30. Seed orientation system 30 includes a seed collector 32 that directs seeds from seed tube 22 to seed orientation coil assembly 40 by way of seed transfer tube 36. Seed collector 32 includes a seed entrance aperture 48 and a seed exit aperture 50. Seed entrance aperture 48 is sized to mate with the seed tube 22. An air line connection 52 is disposed adjacent to the seed entrance aperture. The seed collector 32 may include various indentations or flanges for connection to the seed orientation support structure 34, as well as pins 54 and 55.

Seed transfer tube 36 attaches to seed exit aperture 50 at a first end and to seed orientation coil 40 at a second end. It is envisioned that seed transfer tube 36 will include a mating flange 56 and a retaining pin 57 for connection to the seed orientation coil 40. Pin 41 retains the seed orientation coil assembly 40 relative to the support structure 34.

Seed orientation coil 40 includes an injector core 58 that resides within vented outer coil 60. The injector core 58 includes at a first end incoming air feed 42 and outgoing air feed 62 that provides air through air line 38 to air line connection 52 on the seed collector 32. Injector core 58 further includes a plurality of nozzles 64 arrayed in a helical pattern about the outer face of the injector core 58.

Vented outer coil 60 defines an aperture injector core 58. The vented outer coil 60 includes a seed entrance 66 that mates with flange 56 of the seed transfer tube 36. A plurality of vents 68 are disposed about the outer face of the vented outer coil 60. The vents 68 may have a variety of shapes including rectangular, circular, ellipsoid or other random shapes. The vents 68 do not have to be uniform in size or shape. At a second end of the vented outer coil 60, seed exit path 44 extends towards the ground. A seed sensor 82 may be attached to the vented outer coil 60 approximate the exit path 44 so as to monitor seed flow.

Seed orientation support structure 34 connects to the row unit shank 16 through hook 76 and flange mount 78. It is envisioned that the geometry and location of such connection points can be altered depending on the structure of the row unit 10. The seed orientation support structure 34 supports the seed orientation coil 40 through flange 70 which extends from the second end of vented outer coil 60. The flange 70 mates within notch 72 of the seed orientation support structure 34. The sub-furrow opener 46 is connected to the seed orientations support structure 34 by roll pins 79 and 80.

Figure 4:
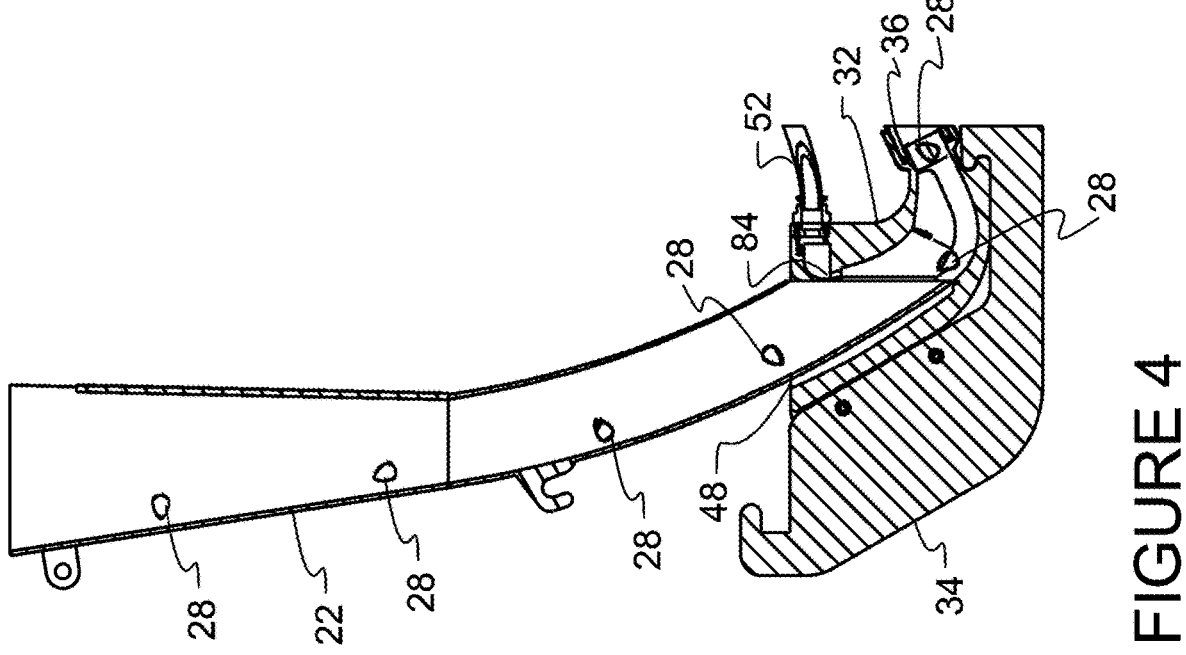
FIG. 4 is a cross sectional view of the seed collector on first embodiment of the seed orientation system.

FIG. 4 depicts the intersection between the seed tube 22 and seed transfer tube 36. The seed tube 22 is inserted through seed entrance aperture 48. Air feed 52 is operably connected to an air blade nozzle 84 which directs air towards the seeds. Air blade nozzle 84 propels the seeds into the seed transfer tube 36. Seeds exiting the seed tube 22 are in a random orientation with a high rotational energy as they have fallen from the seed meter 13 without any attempt at orientation.

Figure 7:
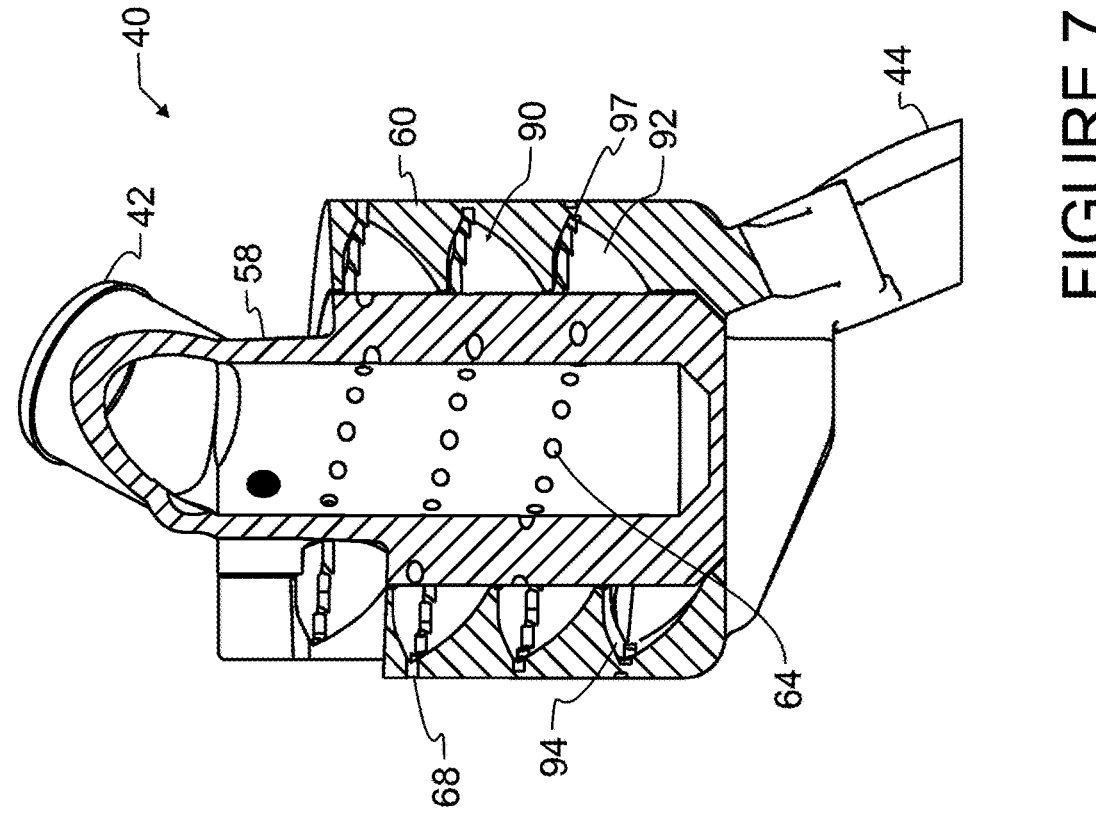
FIG. 7 is a cross sectional view of seed orientation coil assembly of a first embodiment of the seed orientation system.
Figures 5, 6A, 6B:
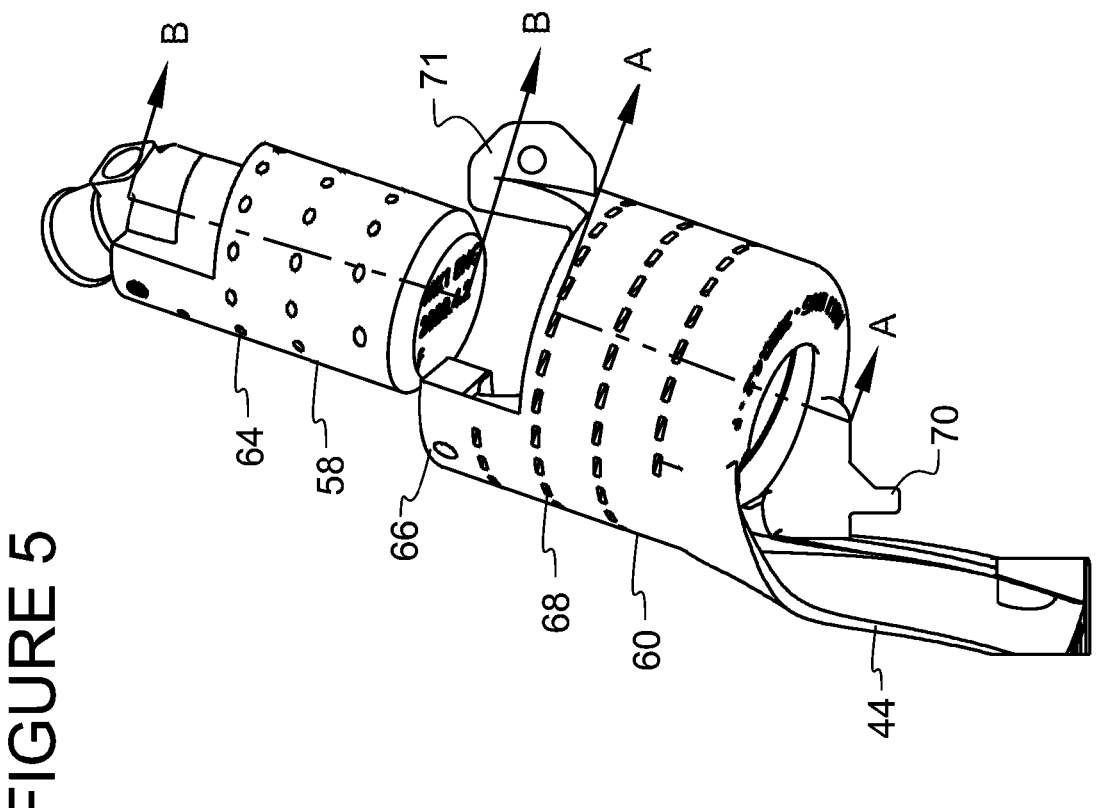
FIG. 5 is an exploded perspective view of the seed orientation coil assembly of a first embodiment of the seed orientation system
FIG. 6A is a cross sectional view of an injector core taking along lines B-B of FIG. 5.
FIG. 6B is a cross sectional view of a vented outer coil taking along lines A-A of FIG. 5.

FIGS. 5 through 7 depict a first embodiment of the seed orientation coil assembly 40 in which the random position of the seed is changed to an oriented tip down position. FIG. 6A illustrates an exploded view of the seed orientation coil assembly 40. FIG. 6A is a cross sectional view of the injector core 58 taken at B-B. FIG. 6B is a cross sectional view of the vented outer coil 60 taken at A-A. Injector core 58 is nested within vented outer coil 60. The vented outer coil 60 is attached to the seed orientation support structure 34 at flange 70 and mounting point 71.

The injector core 58 is generally cylindrical in shape with an air aperture 85 at a first end and a closed aft end 86. A plurality of nozzles 64 are shown in a helical pattern creating air passages between the central aperture 87 of the injector core and the vented outer coil 60.

The vented outer coil 40 is generally cylindrical in shape with an open central aperture for insertion of the injector core 58. The exterior wall of the vented outer coil 40 includes a plurality of vents 68 that create air passages. The vented outer coil 40 further includes seed entrance 66 that opens to helical pathway 90.

FIG. 6B illustrates the helical pathway 90 of the vented outer coil 60. Helical pathway 90 includes seed riding surface 92 that intersects with seed guide wall 94. The seed riding surface 92 is curved so as to have a tighter or smaller radius towards the aft end 96 and a wider radius at the seed entrance end 95. The seed guide wall 94 intersects the seed riding surface 92 at ninety degrees to form a seed riding path 97. The plurality of vents 68 are generally disposed at the level of the seed riding path 97 on the seed riding surface 92. In a first embodiment the helical pathway 90 completes three revolutions about the injector core 58.

FIG. 7 illustrates the cross-sectional view when the injector core 58 is disposed within the vented outer coil 60. In a first embodiment, the outer wall of the injector coil 58 forms the inner barrier for the helical pathway 90. As such, the vented outer coil 60 does not require an inner wall or barrier. The helical pathway 90 terminates at the seed exit path 44. The curvature of the helical pathway 90 is changed as it transitions to the seed exit path 44 so the flat of the corn seed stays firmly positioned against the exit wall. The direction change of the path also separates the somewhat chaotic airflow of the injector nozzles and leaves only a nice laminar flow that helps the seed retain its ordered state of sliding flat on the smooth path surface, tip forward.

Figure 9:
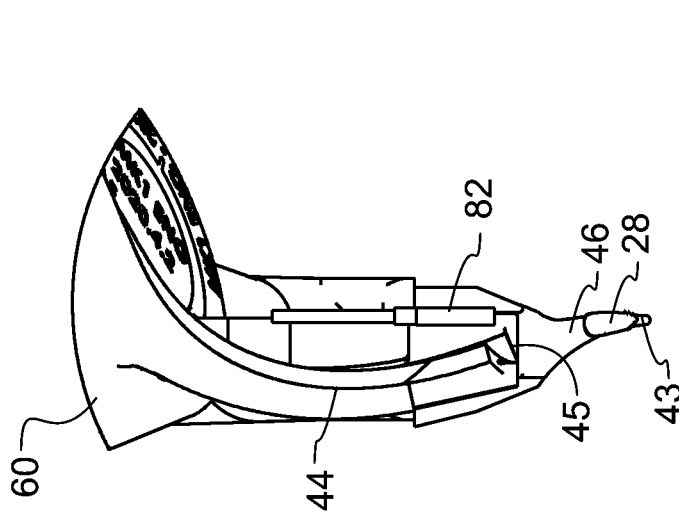
FIG. 9 is a detail view of the seed orientation system from FIG. 8.
Figure 8:
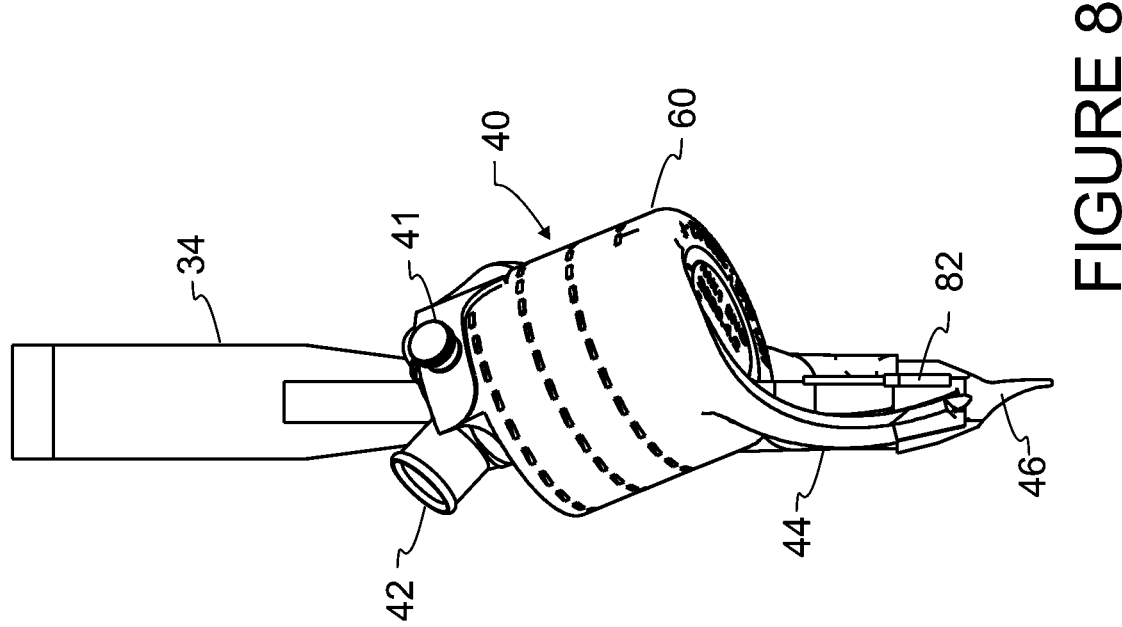
FIG. 8 is a rear perspective view of the seed orientation system

FIGS. 8 and 9 illustrate the seed orientation exit path 44 and sub-furrow opener 46 which are part of the seed orientation coil assembly 40. The seed orientation exit path 44 is a continuation of the helical pathway 90. The seed sensor 82 is disposed approximate the seed exit point 45. The purpose of the seed sensor 82 is to make sure the row unit 10 is actually planting seeds and, if not, will alert the person in the tractor that the row isn't planting because either the seed ran out in hopper or seed is plugged in the seed tube.

As depicted in FIG. 3, the sub furrow opener 46 may define an exit path aperture 47 that holds the exit path 44 and a support structure aperture 49 that allows for mounting the sub-furrow aperture 46 to the seed orientation support structure 34. The sub-furrow opener 46 also features an extended bottom slot or extension 43 that shapes the sub-furrow to prevent the seed tip from hitting the bottom of the sub-furrow and recoiling out, losing its orientation. The seed sensor 82 is operably connected to the structure of the sub-furrow opener 46. The exit path is also swept backward to help reduce the horizontal velocity delta of the seed versus the ground that the seed is coming into contact with.

As the seed leaves the exit path 44 it will be airborne for a short distance, maintaining its stable state. The exit path 44 aims the seed at a sub-furrow created by a sub-furrow opener 46. The sub-furrow opener 46 shapes walls into the soil that come into contact with the flat sides of the seed, wedging the seed into the soil, retaining its orientation.

The sub-furrow opener 46 also has a blade 51 that is swept back. This is to prevent clogs from soil entering up into the seed path when the planter is initially setting down into the soil. This can be achieved because the seed is shot backward at an angle, missing contact with the former blade 51. This swept back former blade 51 also helps keep the sub-furrow walls from collapsing prematurely in loose soils. Collapsed walls would result in the seed bouncing, losing its orientation.

Figures 10, 11:
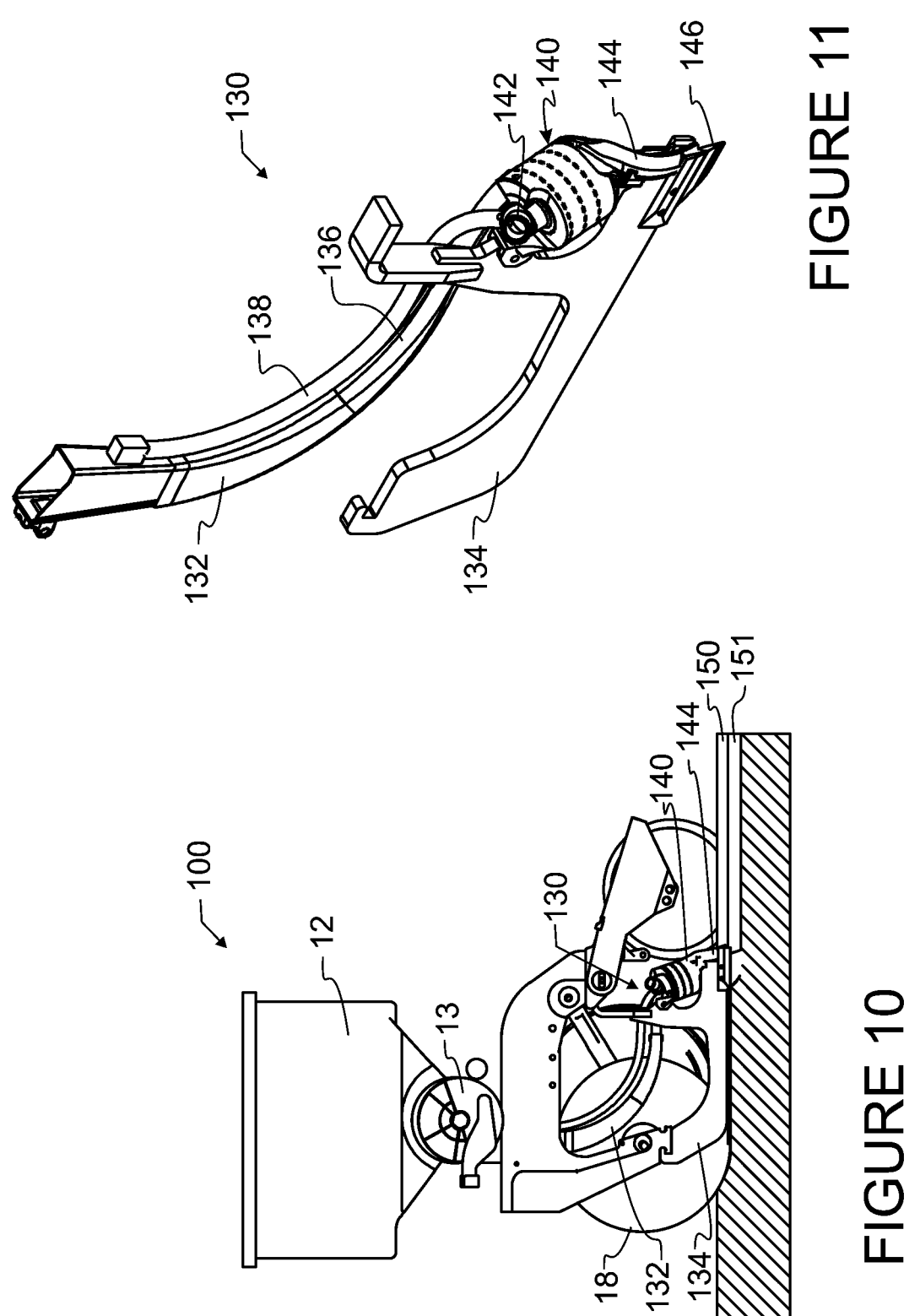
FIG. 10 is a planar view of a planter row unit with an alternate embodiment of a seed collector.
FIG. 11 is a planar view of an alternate embodiment of a seed collector.

FIGS. 10 and 11 illustrate an alternate seed collector design wherein the existing seed tube is removed and the seed orientation system 130 is directly connected to the seed meter. The seed orientation system 130 is mounted to the row unit 100. Seed orientations system 130 includes a seed collector 132 operably attached to the seed meter 113. The seed collector 132 gathers the seed and changes its direction by way of a seed transfer tube 136 to a seed orientation coil assembly 140. The seed passes through the helical path of the seed orientation coil assembly 140 to an oriented seed exit path 144. A sub-furrow opener 146 creates a wedge-shaped trough within the furrow for capturing the oriented seed. The opener blade 18 creates a furrow 150 and the sub-furrow opener creates a trough 151 within the furrow 150.

Movement of the seed throughout the seed orientation system 130 is aided by air from a central blower/fan. Air is first directed to system air infeed 142 disposed on the upper face of the seed orientation coil assembly 140. An air line 138 is then directed to seed collector 132 for moving the seed from the seed collector 132 to the seed orientation coil assembly 140. The seed collector 132 catches seeds directly from the seed meter 113 and gently transports the seed under air power in the most direct and efficient path possible to the seed orientation coil. This configuration improves seed spacing and minimizes seed tumbling. A seed orientation support structure 134 provides the structural support for the seed orientation coil 130 and the sub-furrow opener 142.

In operation, the seed orientation system 30 delivers seeds from a row unit 10 to the ground in an optimal growing orientation. Seeds are placed in seed hopper 12. The seed hopper 12 includes an opening to direct the seed to a seed meter 13. The seed meter 13 then attempts to singulate the seed and spaces the seed out for delivery into the ground. The seed orientation system 30 either collects the seed from the seed tube 22 or from a seed collector 132 that replaces the seed tube 22.

A high-flow pressurized air system propels the seed to from the seed collector 32, 132 through a seed transfer tube 36, 136 to the seed orientation coil assembly 40. A major factor in seed stability is catching/collecting the seed as gentle as possible from the seed meter. The seed ideally slides gently vs. tumbling into the orientation coil. This may be achieved by a very gentle and gradual collector path 132 from the meter to the coil to reduce acute angle impacts resulting in tumbling. A tumbling seed entering the orientation coil can result in tumbling through the entire coil as the air jets will just add to the disordered energy of the tumbling seed instead of stabilizing it.

The seed enters into a vented outer coil 60 of the seed orientation coil assembly 40, said vented outer coil 60 defining a helical pathway 90 to a seed exit path 44. The vented outer coil 60 includes a plurality of air vents 68 disposed radially about an outer wall of the vented outer coil 60.

Pressurized air is injected into the injector core 58 of the seed orientation coil assembly 40. The injector core includes a plurality of air injectors or nozzles 64 disposed radially about the outer wall of the injector core 58. The nozzles 64 direct a focused air stream across the helical pathway 90 of the vented outer coil 60. It is envisioned that the nozzles may be aligned with air vents 68.

Figure 12:
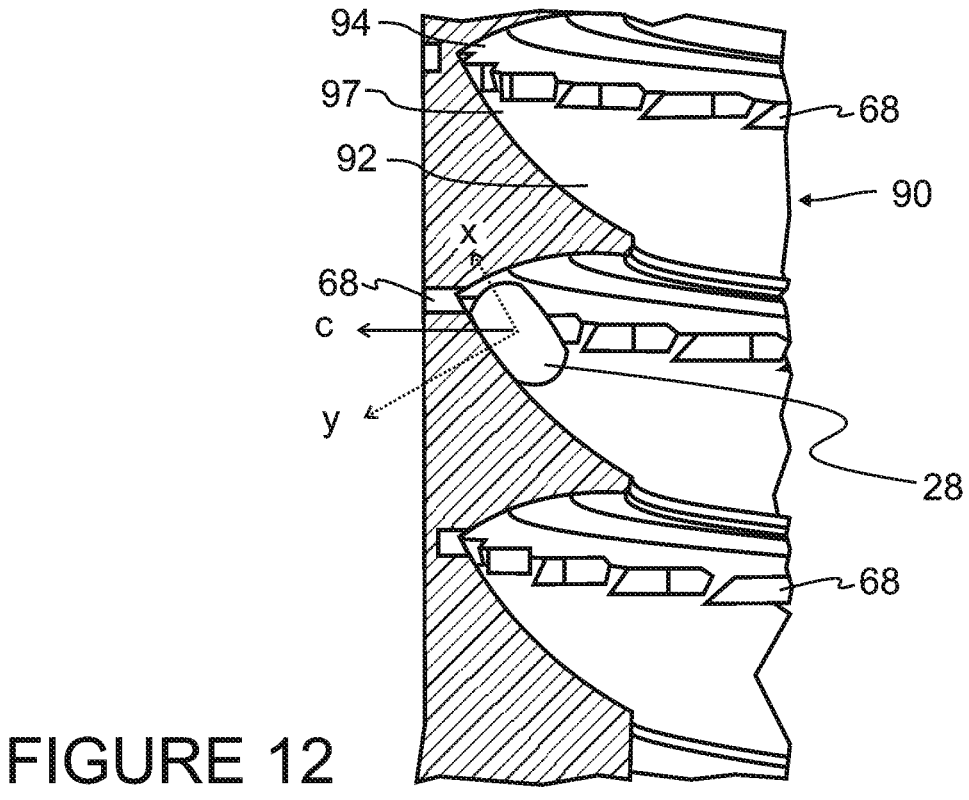
FIG. 12 is a cross sectional view of the vented outer coil illustrating the position of a seed and the representative centrifugal forces on the seed.
Figure 13:
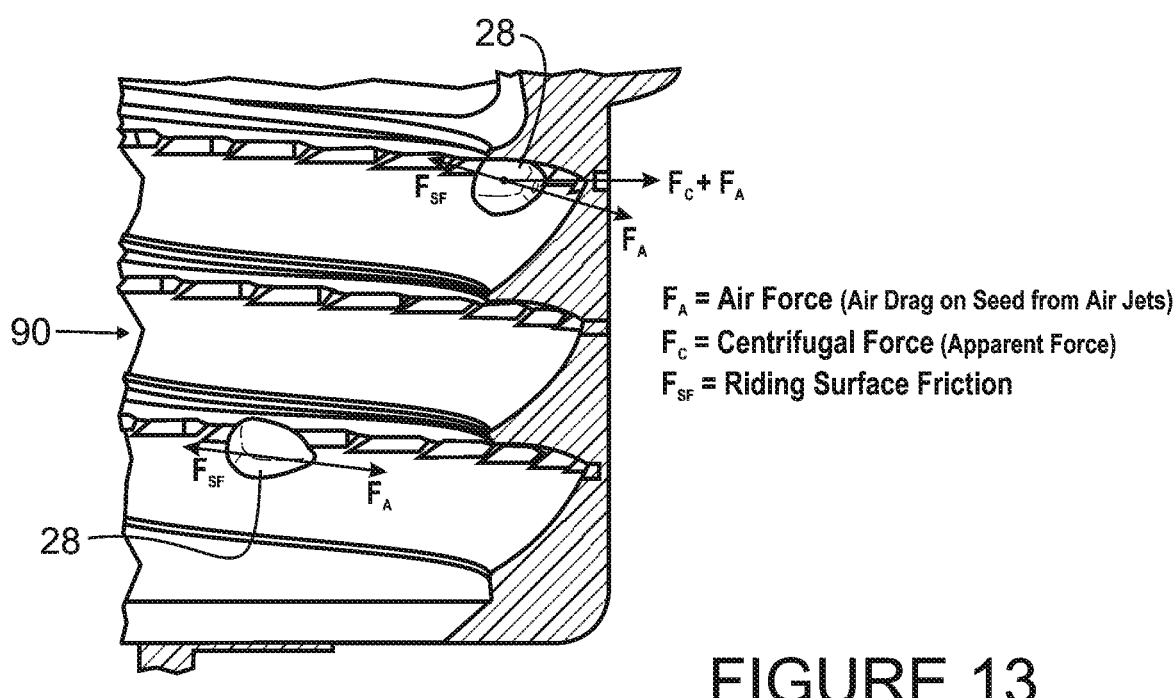
FIG. 13 is a cross sectional view of the vented outer coil illustrating the position of seeds and the representative aerodynamic forces.

The seed enters the helical pathway 90 is a random position. The airflow through the injector core and the vented outer coil 60 push the seed up the seed riding surface 92 to the seed guide wall 94. As illustrated in FIGS. 12 and 13, a centrifugal force $F_c$ (an apparent force) is induced on the seed as it travels its curved/helical pathway 90. The airflow from the injector nozzles 64 hit the seed at an angle, giving two main (pressure) force vector components on the seed. One component pushes parallel to the seed path and the other pushes perpendicular to the seed path. The parallel component of the airflow flows from behind the seed and over the seed, this both propels the seed forward and causes the seed to orient tip forward in the flow (as this orientation has the lowest stable aerodynamic cross section (lowest drag)). This parallel airflow component also increases the velocity of the seed which makes soil capture possible. The parallel airflow may be a combination of the airflow generated by the seed meter and the air flow directed to the seed transfer tube. The perpendicular component of the airflow, combined with centrifugal force $F_c$, pushes the seed into the seed riding surface 92 and seed guide wall 94 to provide the stability needed to maintain the tip-forward orientation.

After the seed is oriented it is necessary to stabilize the position of the seed all the way to the ground. It is easy to orient a seed for a few seconds but due to the shape of the seed there is a tendency for the seed to tumble out of control. Keeping the seed stable after orientation requires a combination of techniques. In order to a maintain position of the seed, a low friction surface for the helical path 90 is preferred. Low friction, low roughness and/or lubricious surface reduces any tumbling of the seed as the seed will not "dig in" or "catch" on the surface and instead induce the seed to slide, maintaining an oriented position. An energy absorbing surface is also beneficial for it will "deaden" seed impact energy from tumbling and allow the seed to ride vs. rolling and/or tumbling and help maintain an oriented position. The path from the seed meter 13 to the orientation coil 40 also benefits from the properties listed above for the orientation coil riding surface 90.

A curved path also acts to maintain the seed orientation through a centrifugal force $F_c$. The centrifugal force $F_c$ acts on the seed, to drive the seed into the surface to stabilize and reduce bouncing, tumbling and to help retain an oriented position. In addition to the curved pathway 90, a riding surface shape/profile that has a guide wall helps to precisely locate, stabilize, and maintain the orientation of an oriented seed. The curved shape of the riding surface will also help align the seed longitudinally along the seed path which aids in the orientation process.

The seed is then directed to the seed exit path 44 and then into a scored sub-furrow inside a main furrow that is used to capture or wedge the seed to retain its orientation and/or position. The seed orientation can be captured/preserved if the seed is propelled into an interference fit sub-furrow in the soil that the seed wedges into. The sub-furrow profile preferably needs to taper down to allow seeds of all sizes to be captured. The profile should also have an extended bottom to prevent the seed tip from hitting the bottom of the sub-furrow and recoiling out before becoming wedge/taper locked.

The seed orientation coil assembly 40 is angled relative to the normal with the ground to help reduce the seed/ground velocity delta. At a typical 5 mph planting speed and what would be a 5 mph horizontal velocity delta, the angled coil should reduce the velocity delta to about 2 mph. At a slower 3 mph planting speed, the seed would be a dead drop into the sub-furrow.

Figure 14:
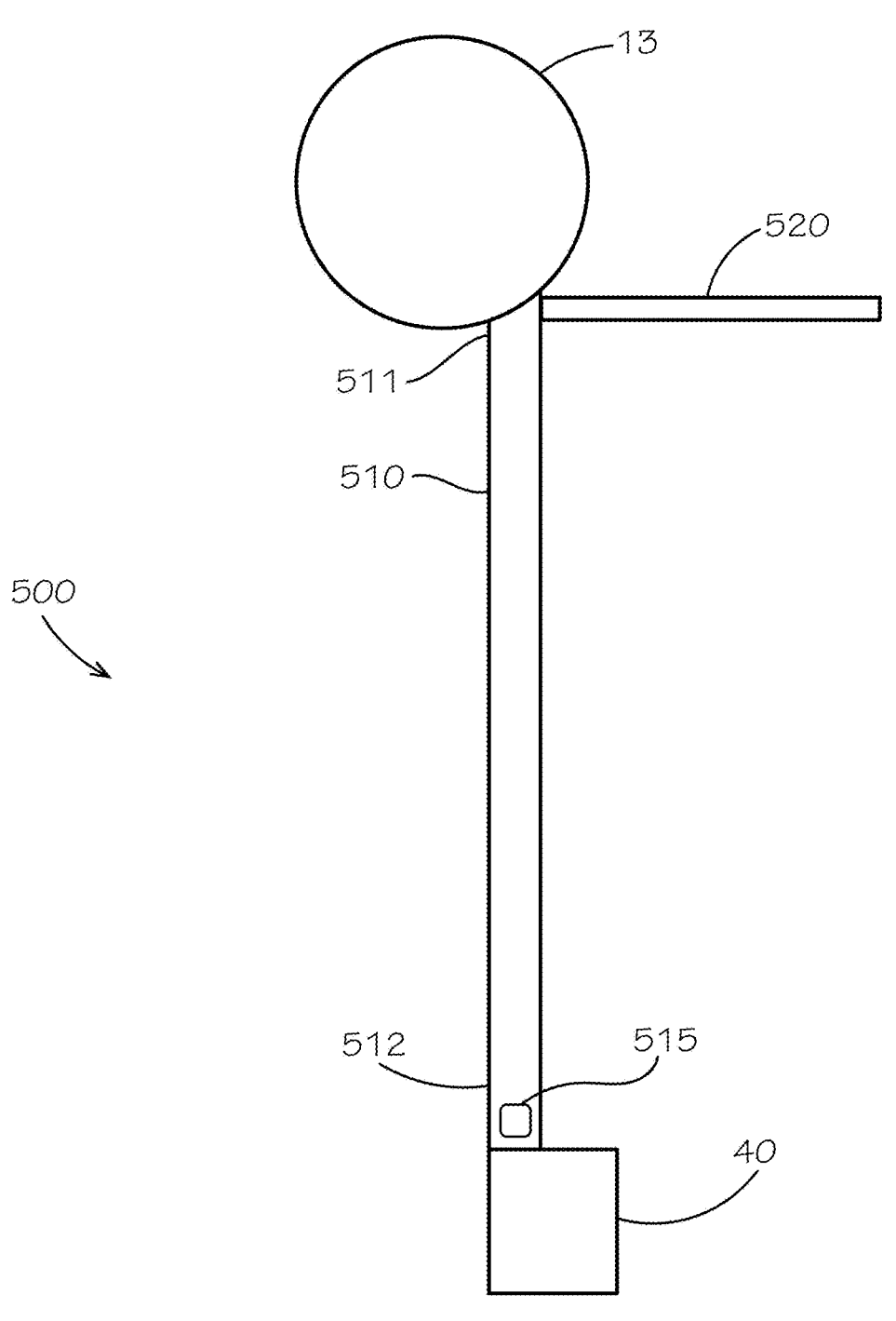
FIG. 14 is a schematic of a seed acceleration system.
Figure 15:
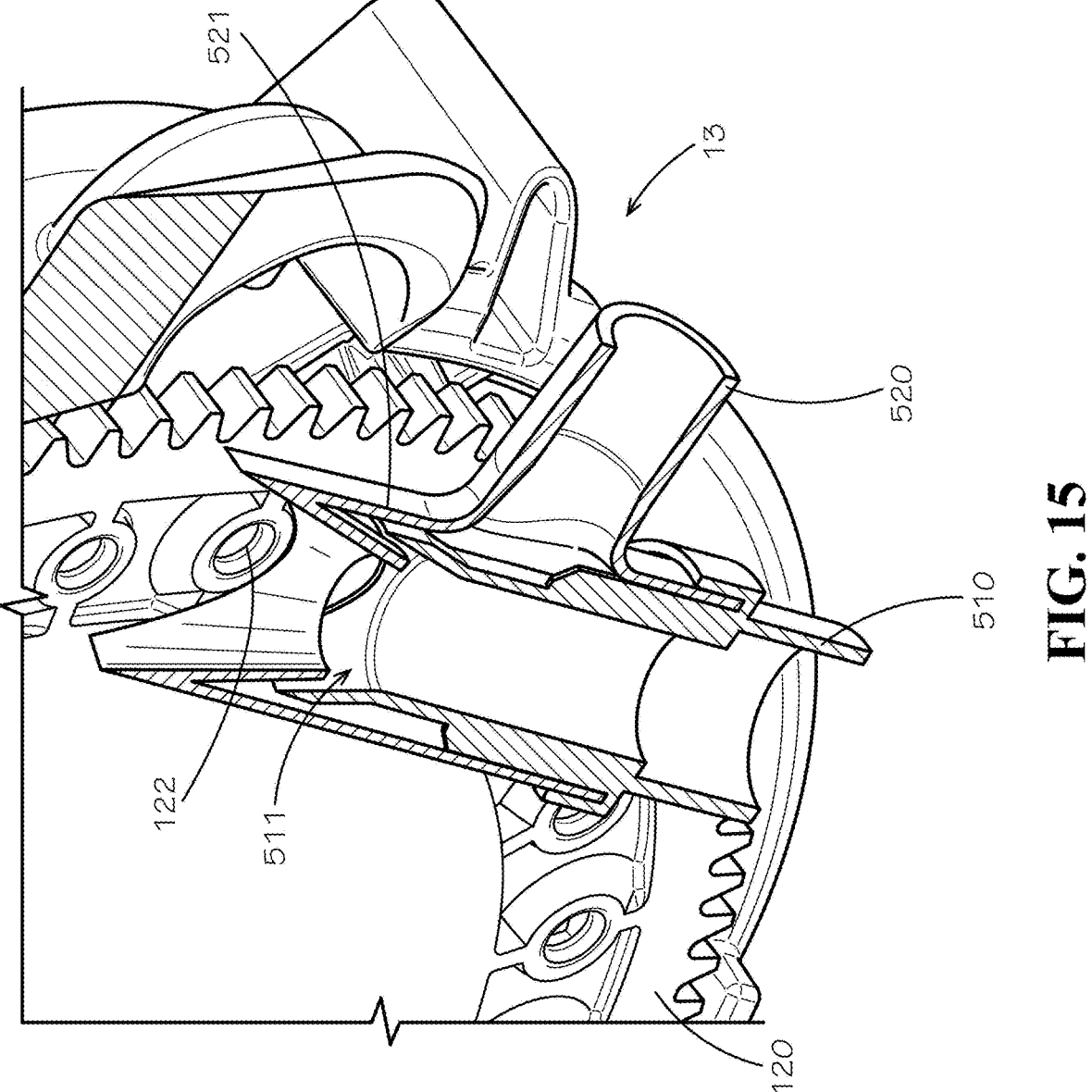
FIG. 15 is a sectional view of the seed meter of the seed acceleration system of FIG. 14.

FIGS. 14 and 15 illustrate a seed acceleration system 500 for accelerating seed from seed meter 13 to seed orientation coil assembly 40. Conduit 510 having a first end 511 and second end 512 is disposed with first end adjacent to a seed release from a seed aperture 120 on seed disc 120 in seed meter 13. Gas supply line 520 supplies gas to nozzle 521, which is in fluid communication with conduit 510. In FIG. 15, conduit 510, gas supply line 520, and nozzle 521 are shown in sectioned view. The gas can be any gas and includes, but is not limited to, air or nitrogen.

Proximate to second end 512, an optional vent 515 can be provided to vent the gas before the gas enters the seed orientation coil assembly. By venting conduit 510, seed orientation coil assembly 40 does not need vents 68. Seed orientation coil assembly 40 can have an enclosed outer surface. Vent 515 can vent all gas, a partial amount of gas, or a majority of gas from conduit 510. There can be one vent 515 or a plurality of vents 515.

Figure 16:
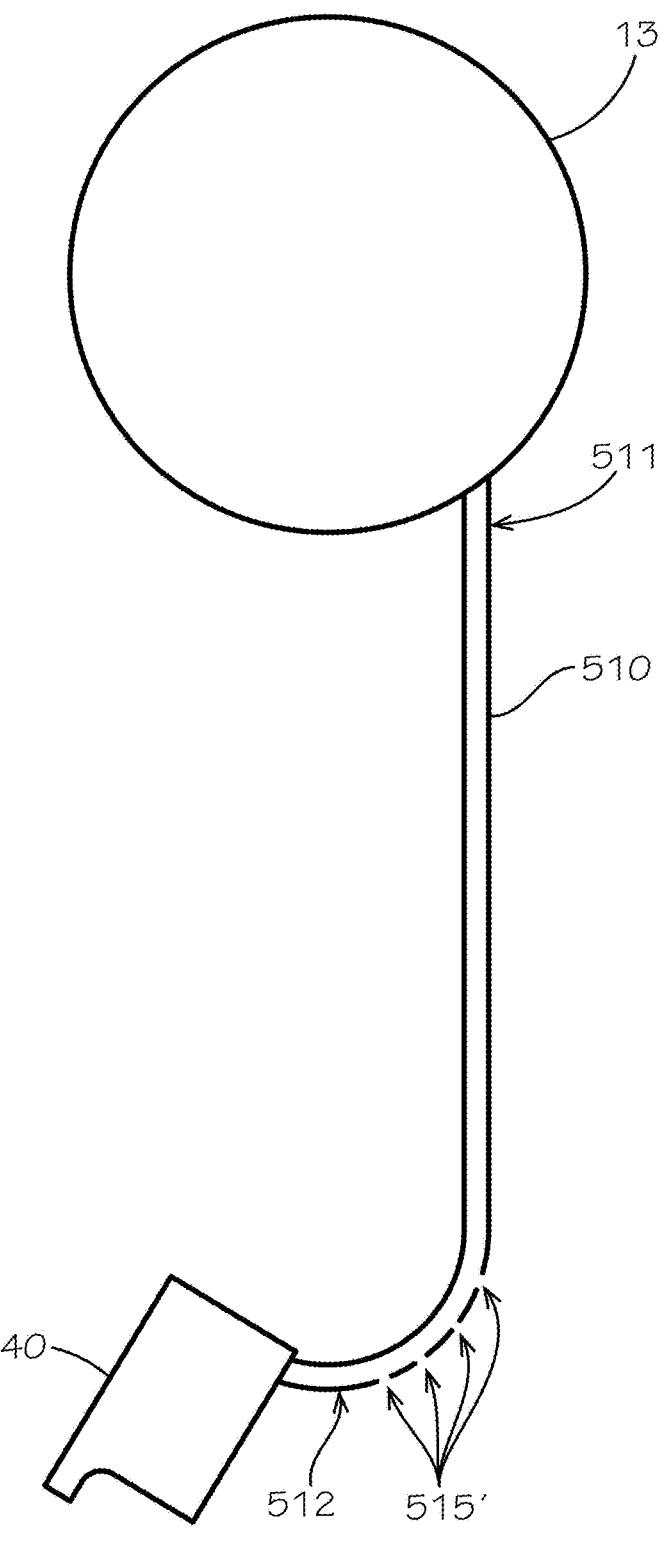
FIG. 16 is a schematic of another seed acceleration system.

In another embodiment illustrated in FIG. 16, second end 512 is curved before entry into the seed orientation coil assembly 40. There can be one or a plurality of vents 515' in the curved portion of second end 512. Vents '515 can be disposed through the outer radius of the curve.

An example of a seed meter 13 is described in PCT Publication Nos. WO2012/129442, WO2016/077651, and WO2007/024646.

Other pneumatic seed accelerators are described in U.S. Patent Publication Nos. US20150122162A1, US20170105334A1, US20200359551A1, US20200359552A1, US20210051844A1, and US20210153423A1, U.S. Pat. Nos. 8,336,471B2, 9,043,950B2, 9,137,941B2, 9,521,804B2, 10,448,561B2, 10,743,460B2, 10,945,363B2, 10,959,368B2, 10,993,366B2, and 10,999,966B2, and PCT Publication Nos. WO2019108881A1, WO2019197963A1, WO2021069599A1, and WO2021069607A1. The outlets of the pneumatic conduits can be connected to the seed orientation coil assembly 40 via air infeed 42 to deliver seed into the seed orientation coil assembly 40.

The terminology used herein is for the purpose of describing particular embodiments only and is not intended to be limiting of the invention. As used herein, the term "and/or" includes any and all combinations of one or more of the associated listed items. As used herein, the singular forms "a,", "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence of addition of one or more other features, steps, operations, elements, components, and/or groups thereof. The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seeding system comprising:
   a seed meter;
   a conduit for receiving seeds released from the seed meter at a first end of the conduit, and the conduit having a second end opposite the first end;
   a gas source connected to the conduit proximate the first end for accelerating seed in the gas;
   a seed orientation coil assembly connected to the second end to receive the accelerated seed; and
   a vent in the conduit proximate to the second end to vent the gas.

2. The seeding system of claim 1, wherein there are a plurality of vents and the conduit at the second end is curved.

3. The seeding system of claim 2, wherein the plurality of vents are on an outer radius of the curve.

4. The seeding system of claim 1, wherein the vent releases all gas.

5. The seeding system of claim 1, wherein the vent releases a majority of the gas.

\* \* \* \* \*